Oct. 13, 1942.   C. E. WYRICK   2,298,327
COUNTERPACK REGISTER
Filed Nov. 12, 1940   10 Sheets-Sheet 1

CLAYTON E. WYRICK, Inventor

Oct. 13, 1942.                  C. E. WYRICK                       2,298,327
                              COUNTERPACK REGISTER
                             Filed Nov. 12, 1940           10 Sheets-Sheet 2

Inventor
CLAYTON E. WYRICK
BY
Attorneys

Oct. 13, 1942.  C. E. WYRICK  2,298,327
COUNTERPACK REGISTER
Filed Nov. 12, 1940    10 Sheets-Sheet 3

CLAYTON E. WYRICK, Inventor

Oct. 13, 1942.       C. E. WYRICK       2,298,327
COUNTERPACK REGISTER
Filed Nov. 12, 1940        10 Sheets-Sheet 6

Inventor
CLAYTON E. WYRICK,
BY
Attorneys

Oct. 13, 1942.  C. E. WYRICK  2,298,327
COUNTERPACK REGISTER
Filed Nov. 12, 1940  10 Sheets-Sheet 7

Oct. 13, 1942.	C. E. WYRICK	2,298,327
COUNTERPACK REGISTER
Filed Nov. 12, 1940	10 Sheets-Sheet 8

Inventor
CLAYTON E. WYRICK,

Oct. 13, 1942.  C. E. WYRICK  2,298,327
COUNTERPACK REGISTER
Filed Nov. 12, 1940   10 Sheets-Sheet 9

CLAYTON E. WYRICK, Inventor

Oct. 13, 1942. C. E. WYRICK 2,298,327
COUNTERPACK REGISTER
Filed Nov. 12, 1940 10 Sheets-Sheet 10

INVENTOR
CLAYTON E. WYRICK
BY
ATTORNEYS

Patented Oct. 13, 1942

2,298,327

UNITED STATES PATENT OFFICE 2,298,327

COUNTERPACK REGISTER

Clayton E. Wyrick, Dayton, Ohio, assignor to The Egry Register Company, Dayton, Ohio, a corporation of Ohio Application November 12, 1940, Serial No. 365,195

26 Claims. (Cl. 282—18)

This invention relates to autographic registers, and in particular to a readily portable device of simplified construction.

It is an object of this invention to provide an autographic register which is compact in design and adapted to take up a small space on a counter, and, further, if desired, may be carried in the coat pocket.

Another object is to devise an autographic register which is operable by raising and lowering of the lid or writing table portion so as to bring about movement of the manifold papers over the writing table in position to be written upon in the next transaction.

Another object is to provide an improved method of feeding manifold paper sheet material over a writing table automatically by manipulating the table.

Another object is to devise a method of feeding superimposed manifold paper webs, having spaced printed forms thereon and perforated or otherwise weakened tear-off sections therebetween, in an autographic register whereby the webs are drawn over a writing table or support and aligned while holding the outer ends of the paper webs fixed.

Another object is to provide an operating means for a register of the character described wherein paper feeding rolls, gears and manual operating cranks are eliminated.

Another object of this invention is to devise a register having means whereby a complete cycle of operation is accomplished upon the opening and closing of the writing table which is hinged at one end of the device and forced open by a spring means.

Another object is to provide a device of this character which is of light weight and adapted to retain a zigzag folded pack of manifold paper sheets in a compartment beneath the writing table which is arranged so that the manifold papers are clamped in position thereon during the writing or recording operation.

Another object is to provide an autographic register which is simple in construction and can be manufactured at low cost, providing an efficient and durable device.

Another object is to devise a machine of this character which has no manual operating cranks or complicated mechanism for feeding the manifold papers over the writing table.

It is a further object to provide a register whereby a complete cycle of operations is effected by merely manipulating a spring pressed lid or hinged portion forming a part of the device.

It is a further object of this invention to provide an operative mechanism for autographic registers wherein by simply manipulating the writing table, feeding of the paper web forms in position over the table is accomplished after a transaction has been recorded.

It is a further object of this invention to provide a device of this character wherein the writing table is hinged and swingable away from the top of the register so as to be manipulated to detach the carbon copy and bring about the feeding of a new set of manifold papers in proper position onto the table whereby upon returning the writing table to its normal writing position the mechanism is set for the next cycle of operation.

It is another object to provide means on a movable writing table for manually effecting the release of the writing table which is yieldably retained latched in its normal writing position and manipulated to bring about unclamping of the manifold papers, detaching of the copy forms to be retained, and movement of new manifold paper forms thereover.

These and other objects and advantages will appear from the following description taken in connection with the drawings.

Referring to the drawings:

Figure 26 is a fragmentary detail view in perspective of the hinged portion of the writing table and associated parts illustrating the table at its open position and showing the manifold pack of paper webs as positioned in the bottom compartment of the register;

*General construction*

Figure 1:
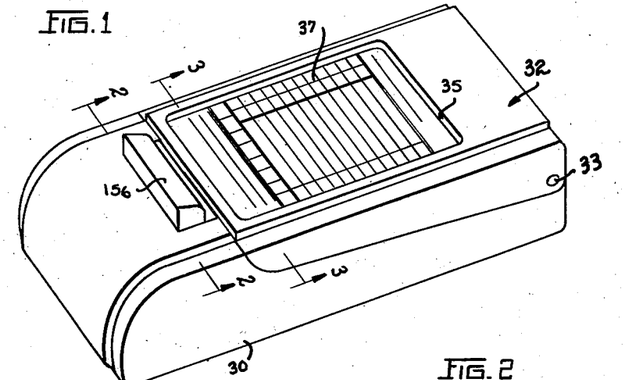
Figure 1 is a perspective view of the autographic register of this invention.
Figure 2:
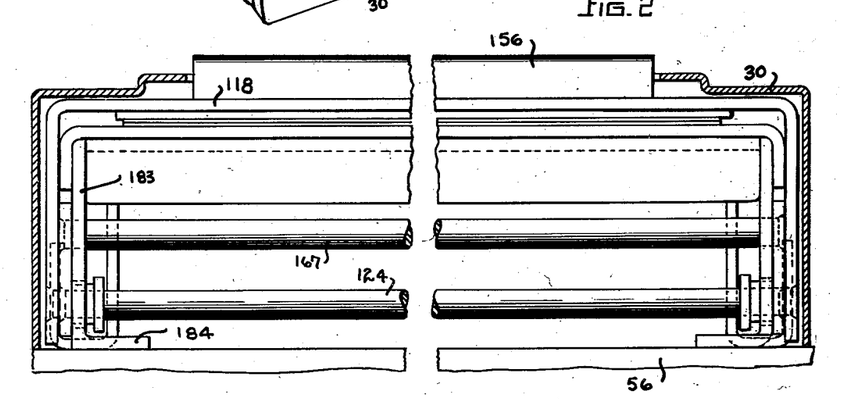
Figure 2 is an enlarged sectional view, partly broken away, taken on the line 2—2 of Figure 1 and looking in the direction of the arrows.
Figure 3:
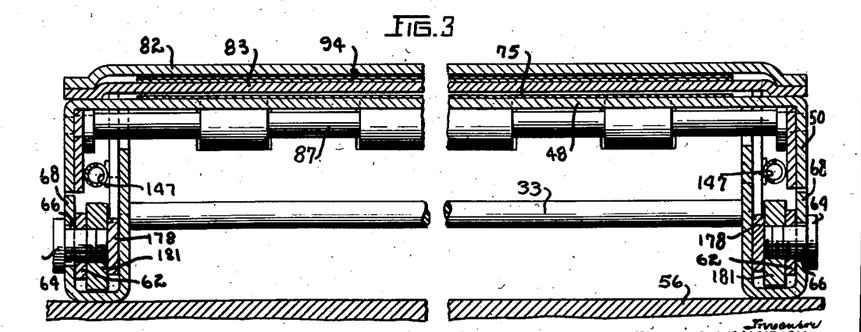
Figure 3 is a similar sectional view taken along the line 3—3 of Figure 1 and looking in the direction of the arrows.

Referring to the drawings in detail, the autographic register of this invention, as illustrated in Figure 1, is of a substantially rectangular shape and has a smooth flat bottom for resting on counters, tables, or other suitable supports during use. The register comprises an outer casing 30 enclosing the working parts and is provided with a lid or cover, generally designated 32, forming a writing table, which is pivoted at one end to the casing 30 by means of a transverse pivot shaft 33. The hinged cover, or lid member 32, has therein the usual writing opening 35 in which the manifold paper web forms 37 are adapted to be positioned for writing upon.

Figures 4, 6:
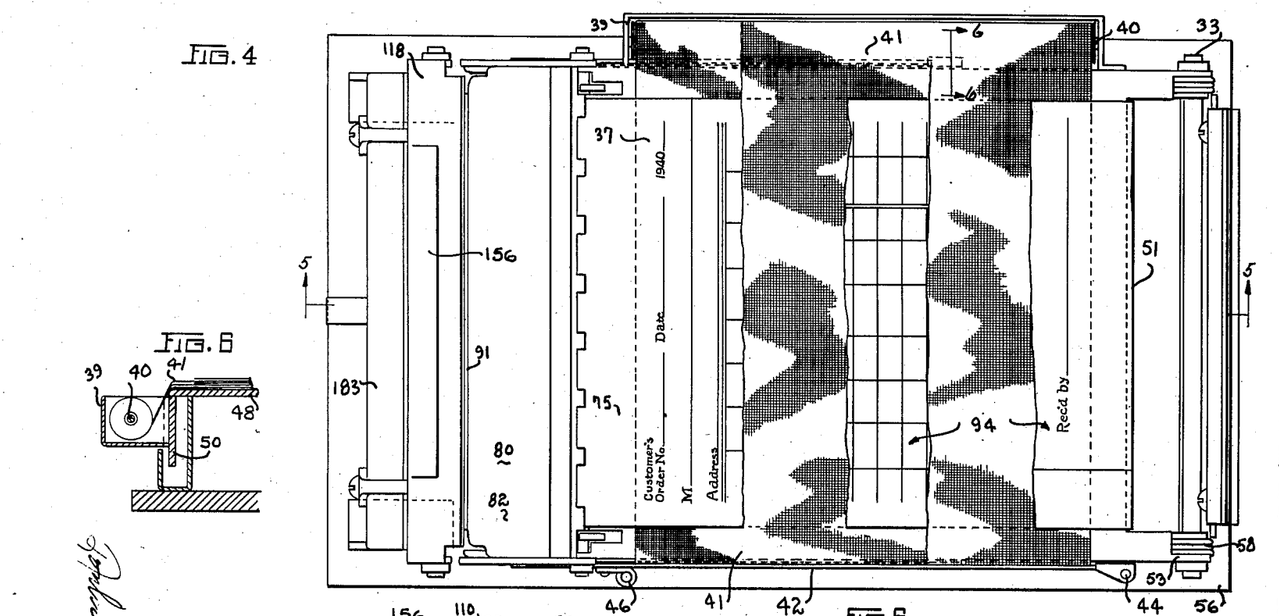
Figure 4 is a plan view of the register constructed according to this invention with the writing paper web form broken away to show the interleaved carbon paper sheets which are arranged transversely of the manifold copy paper web forms.
Figure 6 is a fragmentary detail view illustrating the positioning of the carbon roll comprising the carbon paper sheets and taken substantially on the line 6—6 of Figure 4.

Mounted on one side of the hinged writing table member 32 is a carbon supporting casing 39 having therein a carbon roll support 40, as illustrated in Figures 4 and 6. This mechanism is adapted to support one or more carbon strips or webs 41 arranged transversely of the paper webs drawn over the writing table 32. Suitable means is provided on the side of the writing table opposite the carbon roll support for securing the carbon sheets 41 which are interleaved with the writing paper webs, generally designated 37, to the side of the writing table at their free ends. This means preferably comprises a clamping strip or plate 42 which is pivoted at one end to the side of the writing table as at 44 and is adapted to engage the carbon sheets and hold them firmly against the side of the table. A hook or clasp 46 is utilized for fastening the opposite end of the member 42 to the side of the writing table so as to maintain the carbon sheets fixed until it is desired to withdraw a new section from the roll.

Figure 5:
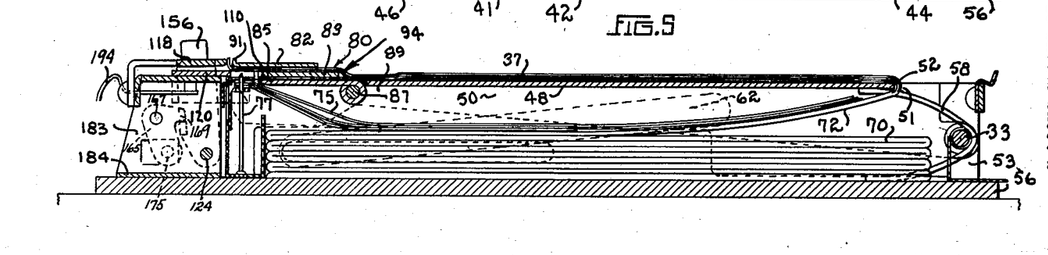
Figure 5 is a cross sectional view taken along the line 5—5 of Figure 4.
Figures 24, 25, 28:
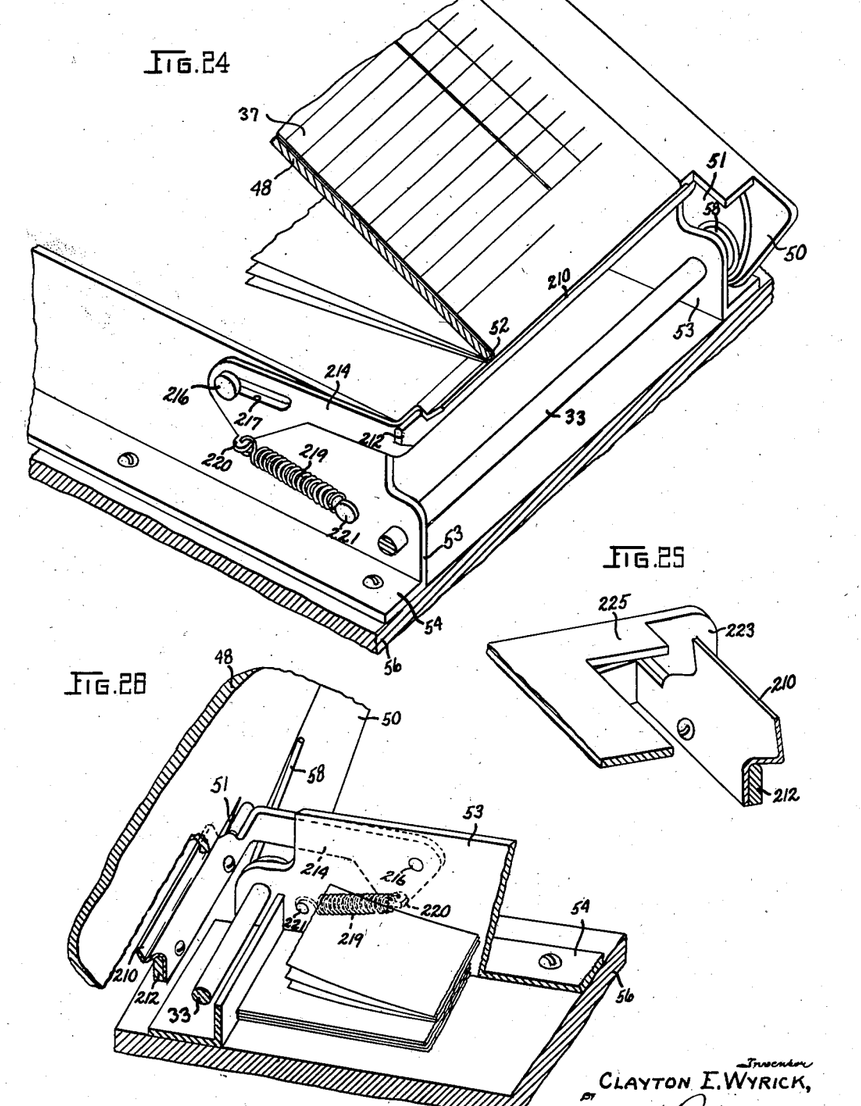
Figure 24 is a perspective view of the clamping means located in the bottom of the writing table adjacent the hinged end for gripping the manifold paper webs when the writing table is in its uppermost position as shown in Figures 10 and 11.
Figure 25 is a detail perspective view of an end portion of the paper web clamping means illustrated in Figure 24 showing its shape and coaction with the bottom portion of the table during movement of the same.
Figures 27 to 29, inclusive, are progressive fragmentary detail views taken substantially on the line A—A of Figure 10 and looking in the direction of the arrows. The views illustrate the relative position of the perforated section of the record sheet which is detached from the continuous web by swinging the forward hinged section of the writing table upward to bring the knife edge means in contact with the perforated section of the paper web and effect detachment of the record sheet after each transaction has been recorded preparatory to returning the table to its normal position.

As shown in Figures 5 and 24, the writing table 32 comprises a flat top paper supporting member 48 which has integral depending side apron portions 50 through which the shaft 33 extends forming a pivot about which the table is swung. A cutaway sector or opening 51 is provided adjacent the pivot shaft 33, as shown in Figure 24, through which the manifold paper webs 37 are drawn and moved upward over the writing table. The lower end of the paper supporting member 48 is beveled, as at 52, to provide a smooth arcuate surface, around which the manifold paper webs are moved.

The pivot shaft 33 extends transversely of the device and is supported at each end by the angle members 53 which are, in turn, suitably fastened along the flange 54 to the base or bottom member 56. Adjacent each end of the pivot shaft 33 between the writing table skirt portions 50 and angle members 53 is positioned a spring means 58 which is coiled around the shaft 33 and adapted to urge the writing table 32 to swing open.

Pivotally attached at each side of the swingable writing table 32, as at 60, is a bar 62 which steadies the movement of the writing table and accurately gauges the distance which it will swing away from the casing or base support. The side bar 62 is reciprocably secured at the opposite end, by means of a pin or bolt 64, in the slot 66 formed in the side wall portion 68 arranged along the side and preferably integral with the flange portion 54. In this manner, the outward swing of the writing table 32 is predetermined by the length of the slot 66 and this movement brings about feeding of the manifold paper webs across the writing table an accurate predetermined distance with each successive operation after the register has been loaded with the stationary sheet forms and one transaction recorded.

As illustrated in Figure 5, in loading the register of my invention, superimposed manifold paper webs in a zigzag folded pack form, as shown at 70, are placed in the compartment provided and the uppermost layer of the manifold paper webs 72 is inserted through the opening 51 of the hinged table member 32 and advanced around the end portion 52 in position to be written upon through the opening or window 35. The manifold paper webs, generally designated 37, for the purposes of illustration, are shown as comprising one original and two copy papers. The copy sheets, which are adapted to be stored in the register, are designated 75 and are adapted to be secured on the filing pins 77, as shown in Figure 5.

Paper web guide, feeding and detaching mechanism

Pivotally mounted on the free or forward end of the writing table 32 is a manifold paper guide and record copy detaching mechanism, generally designated 80. This mechanism comprises a plurality of manifold paper web separating and guiding plates 82 and 83 attached together and slidably mounted on a web tear-off plate 85.

Figures 21, 22:
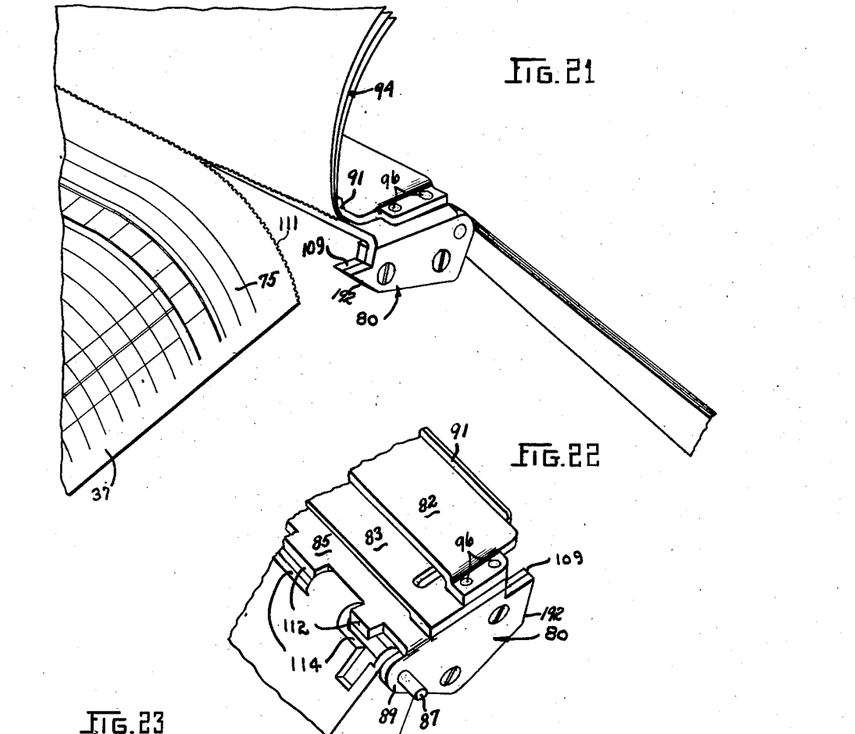
Figure 21 is a fragmentary detail view illustrating the manipulation of the mechanism forming the forward end of the writing table for detaching the record sheet from the manifold web paper when the writing table is in its raised or uppermost position.
Figure 22 is a detail perspective view of a portion of the paper guide and associated mechanism pivotally attached to the end of the writing table illustrated in Figure 21 showing the pivot means for attaching the parts and stop means associated therewith.

Plate 85 is hingedly positioned on the transverse shaft member 87 and is suitably supported at the ends by the downward turned side portions 89 which are pivotably attached to the end portions of shaft 87, as shown in Figure 22. The paper web guide plate 82 is provided with an upturned flange portion 91 which extends across the length of the plate and which is beveled to provide a tear-off edge for assisting in detaching the original and copy paper web forms, generally designated 94, after use. This plate forms the uppermost guide plate for the original and copy web forms, which are normally removed from the machine immediately after the record has been taken of a particular transaction.

Beneath the plate 82 is the web guide plate 83 which functions to divide the manifold paper sheets 94 from the copy sheet or sheets 75 which are to be retained on the filing pins 77. Plates 82 and 83 are suitably fastened together at their ends by means of the bolts or rivets 96 and are yieldably retained on the plate 85 by means of the transverse spring 98. For this purpose, spaced apertures 99 are provided in the plate 85 and winged members 100 along which the spring means 98 is positioned.

Flap means 101 of the plate 85 is arranged with the flap extending in the opposite direction from the winged members 100 and out of line therewith whereby the spring 98 is held under tension at its opposite ends. This permits yieldable movement of the attached plates 82 and 83 in the slotted openings 99 against the tension in the end portion of the spring 98 which yieldbaly retains the flap means 102 of the plate 83 therein.

Figures 10, 13:
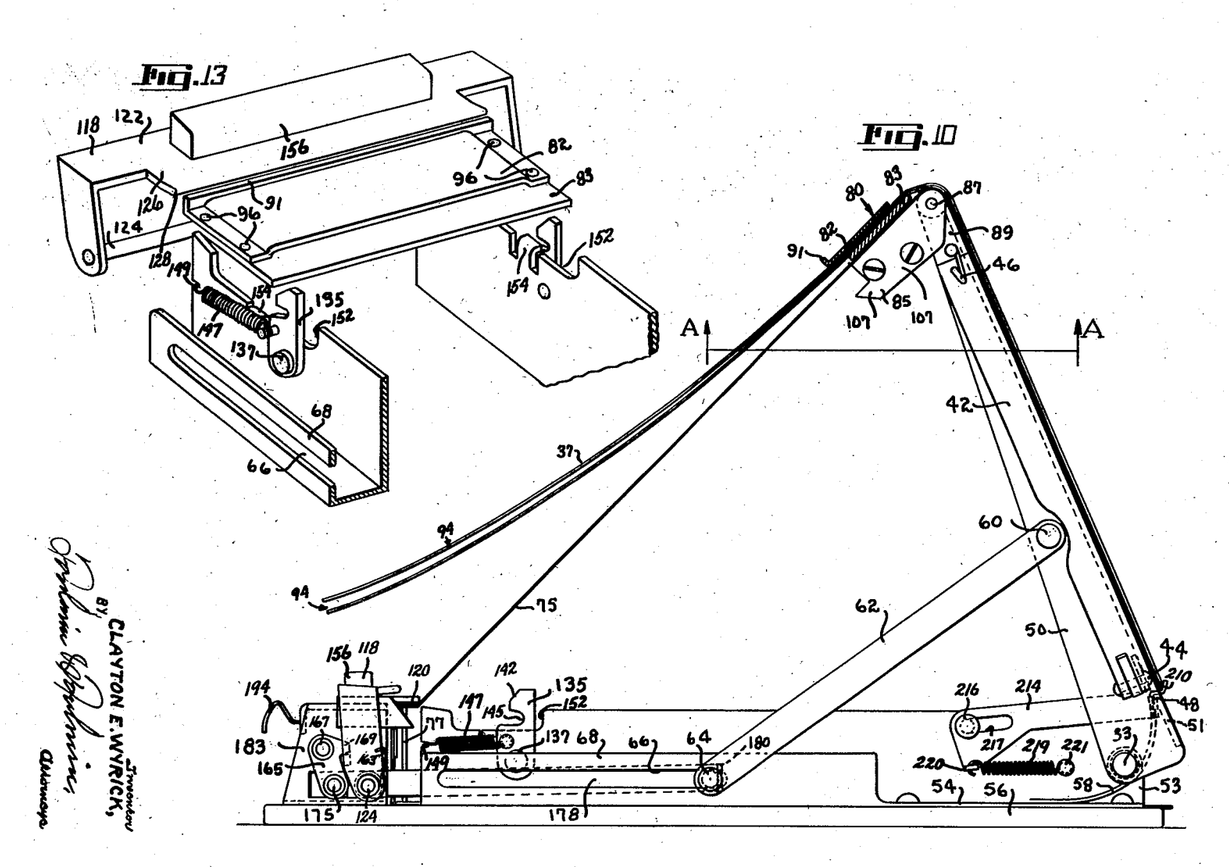
Figure 10 is a similar side elevational view as in Figure 9 illustrating the relative position of the parts after the writing table has reached the outer limit of its movement releasing the clamp holding the outer ends of the original and copy sheet forms which are to be removed from the machine.
Figure 13 is a perspective view of the manifold paper web clamping mechanism, manifold paper dividing plates on the outer end portion of the writing table, and latch means associated therewith, certain parts being omitted in the interest of clearness.
Figures 11, 12:
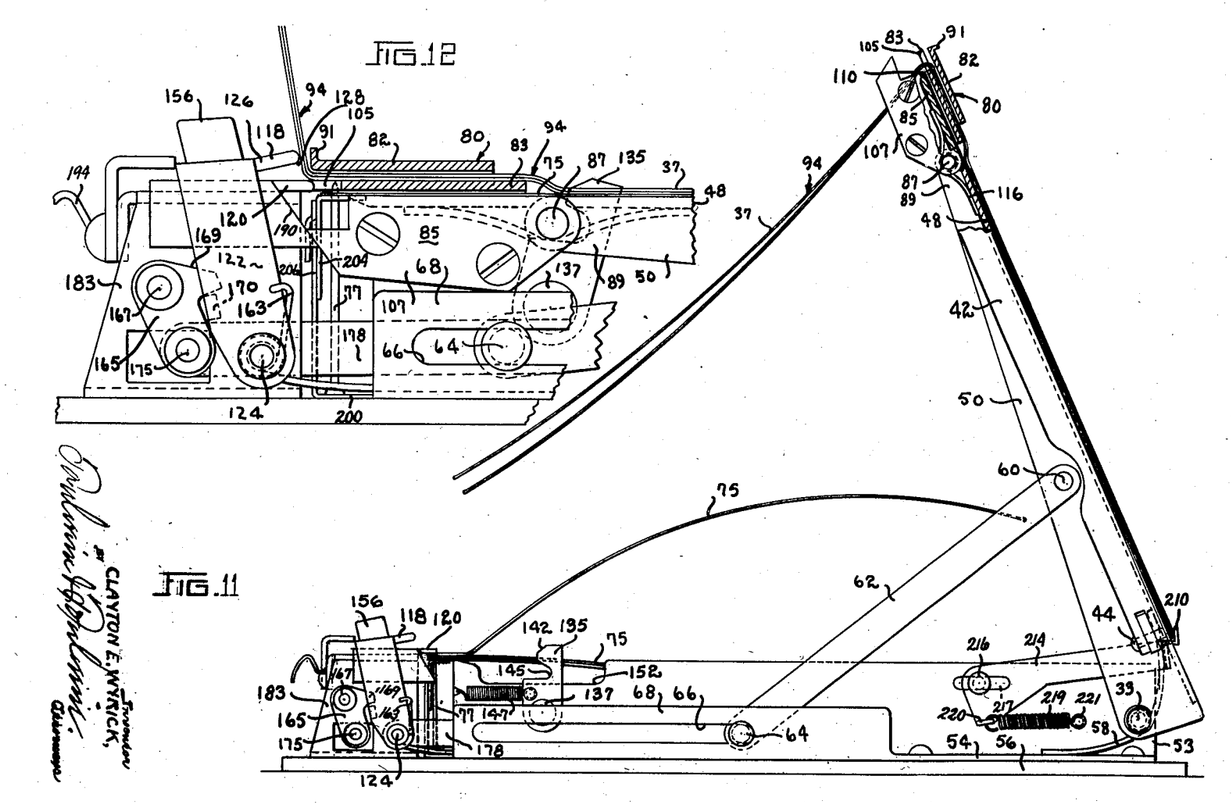
Figure 11 is a similar side elevational view showing the position of the parts after the record sheet detaching member pivoted on the forward end of the writing table has been swung outward to effect the severance of the record copy form or forms which are to be retained in the filing compartment of the register.
Figure 12 is an enlarged detail view of the forward end portion of the register showing the position of the writing table, web clamping mechanism and associated parts in the act of pinning the record sheet onto the filing pins.
Figure 17:
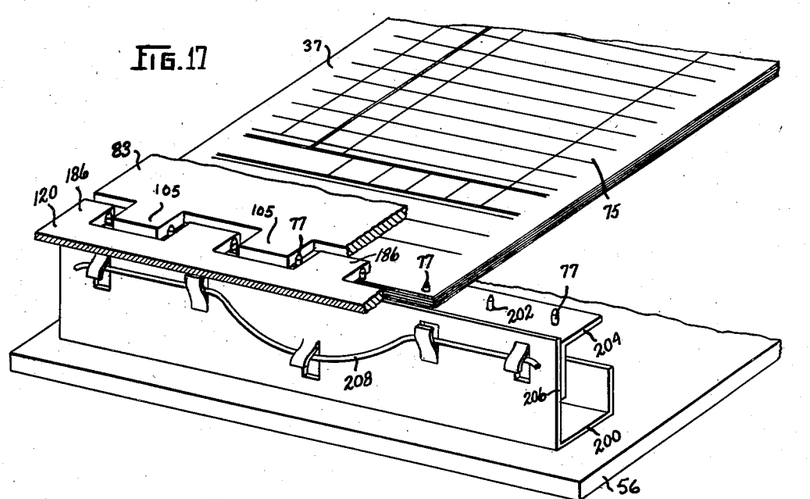
Figure 17 is a detail view in perspective of the mechanism for retaining the record sheet on a rack comprising upstanding pins engaging through a yieldable backing member.
Figure 23:
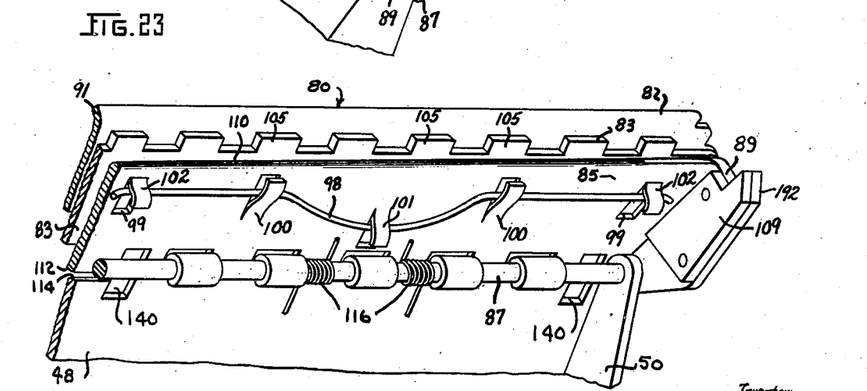
Figure 23 is a perspective view of the mechanism illustrated in Figure 22 as viewed from the underside and partly broken away showing the yieldable means for operating the machine elements.

Plates 82, 83 and 85, forming the manifold guide attachment 80, are arranged in overlapping engagement, as shown in Figure 23, and the outer edge of the divider plate 83 comprises teeth 105 and functions when the writing table is closed to pin the detached copy sheet paper forms 75 onto the pins 77, as shown in Figure 17. Plate 85 comprises integral side wall portions 89 to which is fixedly mounted a latch member 109. This member is preferably formed of hardened metal and is suitably attached to the inner side of the wall portion 107 at opposite ends of the member 80, as shown in Figures 22 and 23. Plate member 85 is provided with an inclined cutting edge 110 for movement against the perforated section 111 of the paper web 75 to cause detachment of the record copy sheet 75 from the manifold papers when the member 80 is swung upward, as shown in Figure 11, during operation of the device. The member 80 is attached to the end of the writing table plate 48 by the rod means 87, as shown in Figure 22, and the abutments 112 along the rear side of the plate 85 are arranged to contact the end wall portions 114 of the plate 48 so as to limit the movement of member 80 when it is swung upward from the position shown in Figure 10 to that shown in Figure 11.

Spring means 116 is arranged on the shaft 87, as shown in Figure 23, to urge the swinging of the member 80 about its pivot 87 to the position shown in Figure 12. This spring action is normally not enough to bring about the movement of the member 80 when the manifold papers are in place, as shown in Figure 10. However, when pressure is exerted against the member 80 by the fingers of an operator when the writing table is in the position shown in Figure 10, it is readily swung to its uppermost position, as shown in Figure 11, severing the copy sheets 75.

Paper web clamping mechanism

Figure 14:
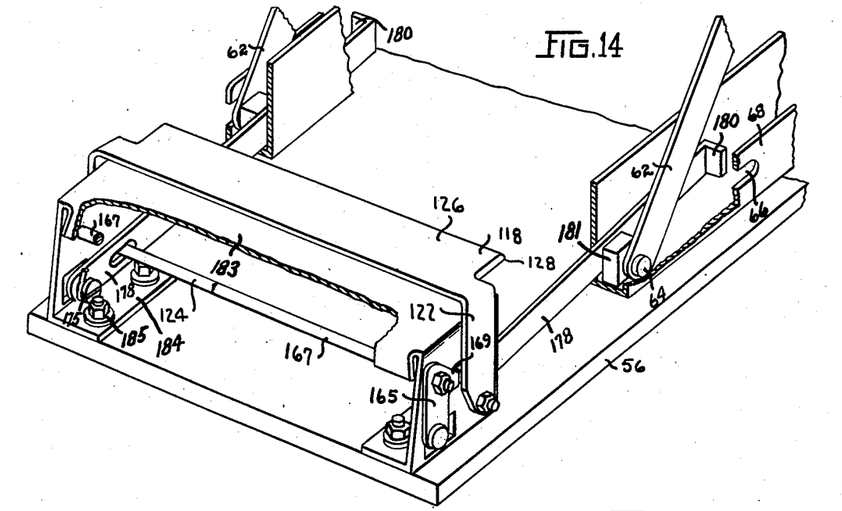
Figure 14 is a similar detail perspective view of the mechanism for releasing the paper web clamping means and associated mechanism, said parts being shown in section and broken away to illustrate the coaction of the elements more distinctly.

In order to provide suitable means for holding the different manifold paper web forms during operation of the autographic register, there is provided a mechanism illustrated generally in Figures 12, 13 and 14. This mechanism comprises the reciprocable paper web clamping member 118 and record sheet holder means 120. The former is arranged to clamp the original and copy of manifold paper forms 94 and the latter is reciprocable over the forward edge of the record sheet 75 to hold them on the file rack pins 77 during drawing of the manifold paper web forms over the writing table, as illustrated in Figure 17. Clamping member 118 comprises a U-shaped member 122 which is pivoted to the transverse bar member 124 and is provided with laterally extending plate portion 126. The outer edge of this plate member 126 is chamfered, as at 128, and adapted to contact the ends of the manifold paper web forms 94, as at 130, and clamp them against the plate 120 disposed beneath the ends of the paper web forms 94.

Figure 7:
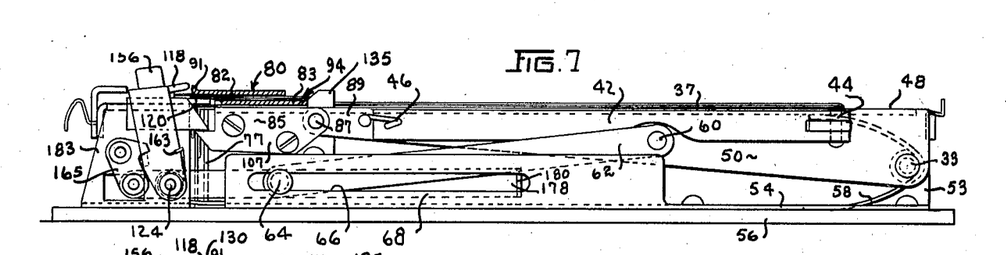
Figure 7 is a side elevational view of the register with the outer casing removed and showing the working parts of the device in their respective positions when the register is ready for use.

When the writing table is in the closed position, as shown in Figure 7, the latch means 135 pivoted as at 137 on opposite sides of the forward end portions of the side wall members 53 is arranged to engage through the openings 140 of the hinged plate members 48 and 85 the shaft 87 and hold the writing table in the normal writing position. The latch means 135 is shaped as illustrated in the figures and comprises the beveled end portion 142 and arcuate opening 145, which opening is adapted to fit over the circular shaft 87.

A coil tension spring means 147 is suitably attached at one end to the latch means 135 and at the other end engages in a notch 149 on the outer end of the side wall member 53, as shown in Figure 13. In the wall member 53 adjacent the latch means 135 there is formed a cutaway sector 152 having abutment means 154 arranged to act as stop means to maintain the latch 135 in proper position to engage over the shaft 87 when the writing table is returned thereagainst in its closed position.

When it is desired to release the latch 135 and allow the writing table to spring open under the influence of the spring means 58, the upstanding boss member 156, which extends through the outer casing, as shown in Figure 1, is grasped by the fingers of the operator and shifted toward the hinged writing plate, which moves the latch means 135 to the right releasing the writing plate whereupon it springs open under the influence of spring means 58. This is brought about by the engagement of the chamfered edge portion at 128 of the member 126 against the end of the plate 82 of the member 80 shifting the plate and attached paper web divider plate 83 against the top of the latch, as shown at 160 in Figure 8.

Figures 8, 9:
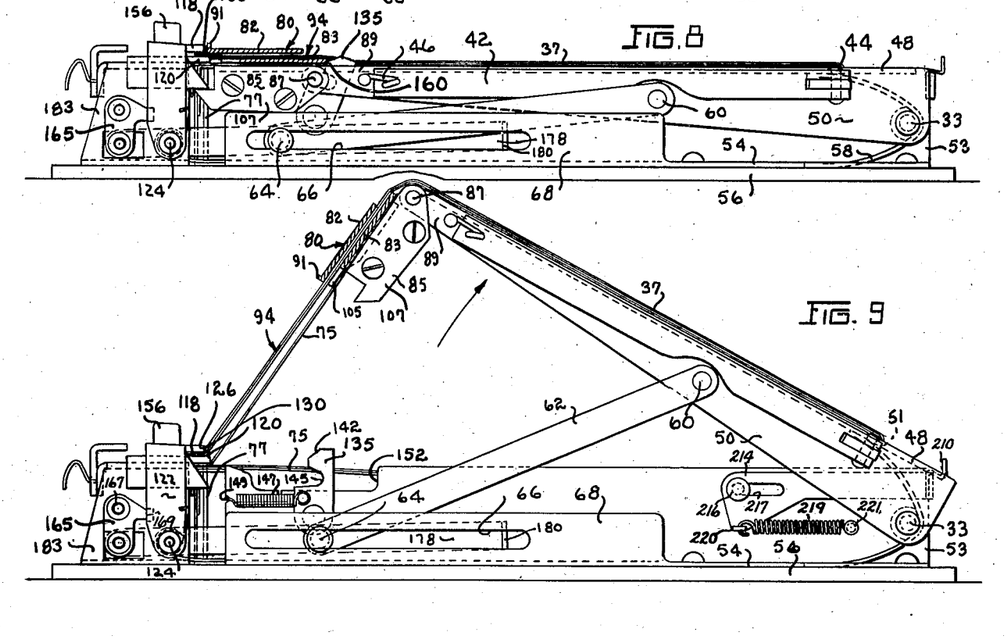
Figure 8 is a similar side elevational view showing the parts of the register device in their relative position after a record has been made and the writing table latch means unlocked with the manifold papers clamped preparatory to removing the original and certain carbon copy sheets from the register.
Figure 9 is a side elevational view of the register showing the writing table midway in its swinging movement away from the base of the register during drawing of additional manifold paper copy forms over the table in position to be written upon in the next transaction.
Figure 16:
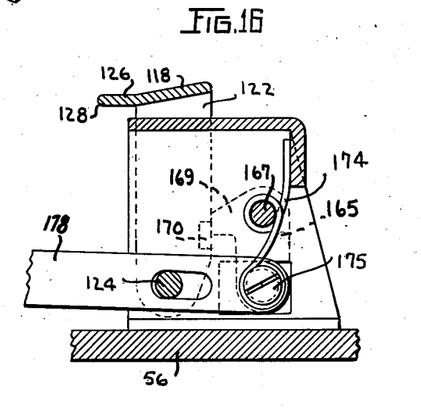
Figure 16 is a fragmentary detail sectional view of the mechanism shown in Figure 15.

Normally the manifold paper clamping means 118 is urged in the unclamped position, as shown in Figures 7 and 12, by the spring means 163. For locking the paper clamping means 118 in position to clamp the ends of the paper web forms 94, as shown in Figures 8 and 9, a bell crank lever means 165 is arranged to swing about the pivot 167 and move the arm member 169 clockwise in position behind the ear means 170 integral with the side wall portions 122 of the member 118. The bell crank member 165 is urged clockwise by means of the spring 174 which engages around the pivot member 167 and is attached to the bell crank lever arm, as shown at 175 in Figure 16.

In order to effect the shifting of the paper web clamping means 118 from the position shown in Figure 9 to that shown in Figure 10, there is provided a rod actuating member 178 which is pivoted at one end to the bell crank lever 165, as at 175. Disposed on the other end of the rod 178 is an integral lug or flange portion 180 which is adapted to be contacted by the member 181 shiftable with the pivot means 64 by movement of the arm 62 when the writing table has swung open approaching its uppermost position, as shown in Figure 10. When this position is approached, rod 178 is shifted to the right moving the bell crank 165 counterclockwise and disengaging the arm portion 169 from the ear member 170 permitting the spring 163 to shift the paper clamping means so as to release the ends of the manifold forms 94, as shown in Figure 10.

Clamping member 118 and bell crank lock means 165 are supported on the saddle-like member 183 having inward extending flanges 184. These flanged portions 184 are suitably bolted to the base member 56, as shown at 185 in Figure 15.

Figures 18, 19, 20:
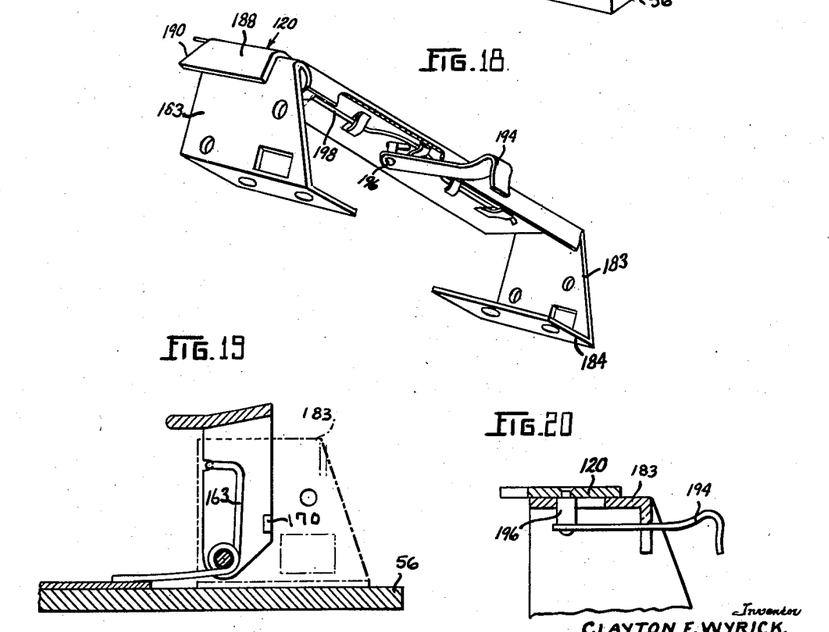
Figure 18 is a detail perspective view of the record copy paper web clamping means and associated spring actuated releasing mechanism.
Figure 19 is a fragmentary detail view in section showing the forward paper web clamp and associated spring means for actuating the same.
Figure 20 is a detail sectional view illustrating the arrangement for releasing the record file sheet holder so that the record sheet or sheets may be removed from the filing rack pins when desired.

Web clamping means 120 which is adapted to hold the copy sheets 75 onto the retaining pins 77 is slidably arranged on member 183, as shown in Figure 18. This member comprises a toothed sector 186 which forms a complementary wall portion which corresponds to the opposed teeth 105 on the web divider plate 83. Space is formed between the teeth sectors 105 and 186 in which the pins 77 are adapted to be positioned, as shown at 117. The record paper web clamping or retaining means 120 comprises the overhanging end portions 188, as shown in Figure 18, and the edges of the said portions 188 facing the writing table are inclined, as shown at 190, and arranged to engage the opposed surface portion 192 of the hardened metal latch members 109 fastened at opposite sides of the writing table on the member 80.

Figure 15:
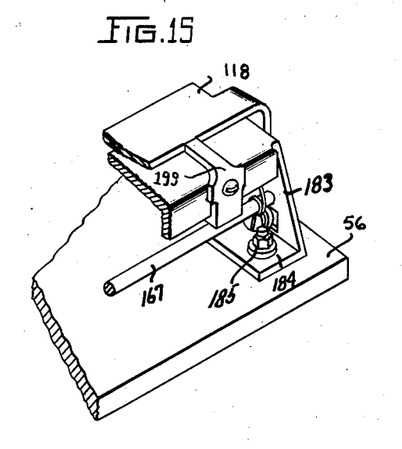
Figure 15 is a fragmentary detail view in perspective showing the arrangement of the parts forming the forward paper web clamping means and associated spring operated mechanism for permitting the actuation of same.

In order to permit removal of the record copy paper sheets 75 from the filing rack pins 77 means 194 is arranged to extend beneath the saddle-like member 183 and is attached to a pin means 196 fixed to the plate 120, as shown in Figures 18 and 20, whereby upon grasping the hook 194 and drawing it back the clamping plate 120 will be shifted off of the ends of the file copy papers 75, as shown in Figure 17. Similar spring means 198 is provided for yieldably retaining the plate 120 on the member 183, as illustrated in Figure 23, for shiftably holding the plates 82 and 83 onto the member 85. For arresting the movement of the web clamping member 118 under the action of the spring 163, when the paper web is not held clamped, the stop or rest pins 199 are provided which are suitably mounted on the back of the member 183, as shown in Figure 15. Preferably two are used, one at each end.

In Figure 17, mechanism is illustrated for retaining the file copies 75 onto the pins 77. This mechanism comprises a U-shaped member 200 having longitudinally spaced pins 77 attached thereto and positioned on the base plate 56. The upstanding pins 77 engage through apertures 202 in a yieldable angle plate means 204 slidably fixed to the side wall portion 206 of the member 200. The reciprocable angle plate member 204 is yieldably fastened to the wall 206 by means of a transverse spring 208 similarly as shown in Figures 18 and 23.

Provision is made for clamping the manifold paper web forms 37 against the table along the end portion 52 as they are moved over the writing table to prevent any backward movement or slippage of the paper webs as the writing table is being lowered to writing position. This mechanism is illustrated in Figures 24 and 25 and comprises the spring actuated angular flange member 210 which is suitably fastened to a supporting bar or backing member 212, as shown in Figure 25. The member 212 is fastened at its ends to the side arm members 214 pivoted to the adjacent wall means 53, as at 216. A slot 217 is provided in the member 214 so as to permit lateral movement of the web clamping means 210 against the tension of the coil spring means 219. This spring is suitably fastened at one end to the ear portion 220 of the member 214 and the other end is fixed to the side wall portions 53, as at 221. Spring means 219 urges the members 214 to rotate counterclockwise about their pivot 216 and force the paper gripping means 210 upward in position to clamp the manifold papers against the lower end of the writing table surface 52, as shown in Figure 24. It will be observed that the paper gripping means 210 is brought into action after the writing table has been sprung open at substantially its uppermost position when the spring actuated attached lever 214 is shifted in the slot 217 to permit the spring 219 to force the lever 214 to swing upward about its pivot 216, as shown in Figure 11. Upon closing the writing table, the initial movement of the writing table from the position shown in Figure 11 allows lateral movement of the paper gripping means 210 against the tension of the spring 219 through co-operation of the end portions 223 of the grip supporting means 212 and writing table end portions 225, as shown in Figure 25. By this arrangement, the paper webs are aligned at their weakened or perforated sections by the upward movement of the clamping means 210 and the webs are firmly clamped against the table portion 52 preventing any tendency for the paper webs to slip backward when the paper web forms 94 are released and the record copy sheets 75 detached, as illustrated in Figures 10 and 11.

The paper web clamping mechanism 210 functions to clamp the paper web in position on the writing table when the table is at its uppermost position, as shown in Figure 10. Upon the return movement of the table, the web clamping means 210 becomes ineffective. This mechanism assures that upon each opening and closing of the writing table member 32, the manifold paper webs will be drawn or fed over the table a predetermined distance, so as to present a new set of forms, and the paper webs are longitudinally aligned and clamped in this position until the manifold paper sheets have been detached as illustrated in Figures 10 and 11.

Figures 29, 32, 33:
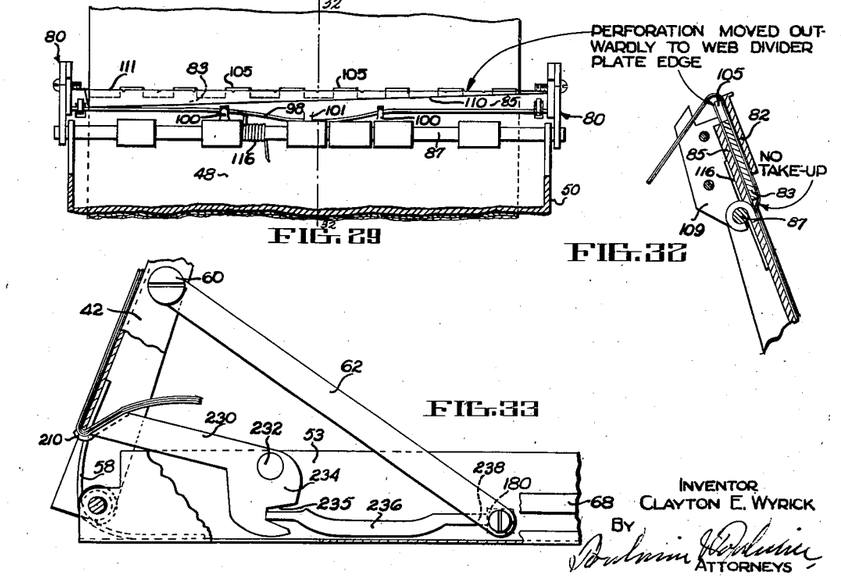
Figure 33 is a fragmentary view illustrating a modified construction of the web clamping means shown in Figure 24 and wherein a positive lever operating means is provided for clamping the paper web against movement over the table while detaching the record sheet copy from the continuous manifold paper web forms.

In the modified construction illustrated in Figure 33, the paper web clamping means 210 comprises the L-shaped bell crank side members 230 arranged at opposite sides of the register and which are pivoted to the side wall member 53 as at 232. The depending arm portion 234 is provided with cutaway section 235 for receiving one end of the abutting link 236 as shown in Figure 33. This link member is slidably positioned between the side wall 53 and slotted member 68 and is arranged so that the end portion 238 is engaged by the block or lug means 180 carried by member 62 when the writing table is released and forced to its full open position by the spring 58. Upon swinging the writing table outward away from the base of the register device, the manifold paper web forms are drawn forward over the table a measured distance proportionate to the maximum degree that the table is swung away from the base support. This movement is accurately gauged so that when the writing table has been fully opened a new set of manifold paper web forms have been moved into place on the table, and at this instance the web clamp 210 is actuated to hold the manifold papers firmly against the bottom end portion of the table or web support 48. In the modified construction shown in Figure 33 the end portion 238 of the link 236 is arranged to be contacted by the lug 180 carried by the rod 62 just before the pin 64 reaches the end of the slot 66 bringing about pivoting of the lever 230 about its pivot 232 to clamp the manifold papers firmly against the end of the table 48 as at 210.

Referring to Figures 27 to 32, there is illustrated by progressive views the position of the perforated portion on the manifold record paper web 75 relative to the knife edge 110 and guide plate 82 when the operator is manipulating the hinged member 80 to effect severing of the record sheet 75 along the perforated line 111.

Figures 27, 30:
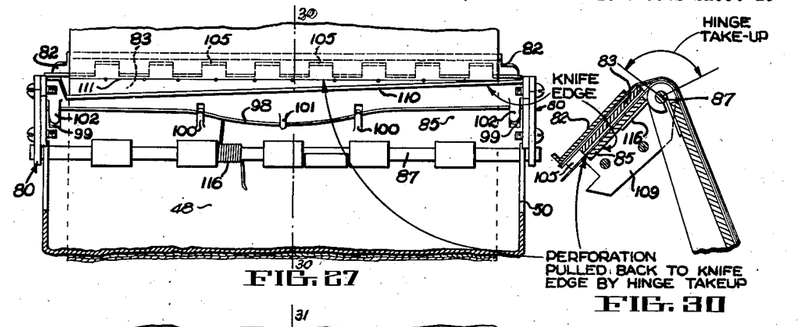
Figures 30 to 32, inclusive, are corresponding cross sectional views taken substantially along the lines 30—30, 31—31 and 32—32 of Figures 27, 28 and 29, respectively.
Figures 28, 31:
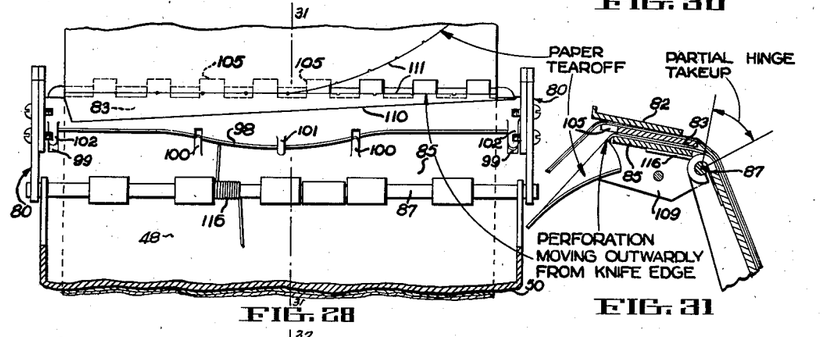

In the position shown in Figures 27 and 30 the edge of the perforation 111 is aligned with the sharp cutting edge of the blade 85 adjacent the right side so that movement of the hinged member 80 upwardly initiates the separation of the record sheet 75 from the continuous web as depicted in Figure 31. The alignment of the record paper sheet along the knife is only at this section which is near the edge of the web and the knife blade is sharpened along this part while the rest of the knife blade length is dull or rounded as illustrated in Figure 23. By this construction, the record sheet 75 will continue to separate along the perforated line 111 as the hinged portion 80 is pivoted upward from the position shown in Figure 30 to that illustrated in Figure 32. The added amount of paper web taken up around the hinge, as indicated by the arrows in Figures 30 and 31, is substantially equal to the linear differential between the sharp starting tear-off edge portion of the blade 85 and the point the paper web will normally reach when the register device is in closed or writing position.

In the construction of the device as illustrated the radius of the hinge formed by the shaft 87 is accurately made so that in pivoting of the member 80 through the angle indicated by the arrow on Figure 30 will take up this linear amount of manifold paper and place the leading edge of the record sheet in position to be pinned onto the file rack pins 77 upon returning the table from a raised position to its normal writing or closed location as depicted in Figure 12.

*Operation*

The operation of the autographic register disclosed in the drawings and described heretofore will be readily understood by referring to Figures 5, 7, 8, 9, 10, 11, 12 and 27 to 32. It will be assumed that the register device is loaded with manifold papers and the ends of the manifold sheets are drawn up over the writing table and positioned as shown in Figures 5 and 7. Further, the carbon paper sheets 41 are interleaved between the manifold papers upon which copies of the original transactions are to be made. After the record has been made on the copy sheet form disposed in the window of the writing table and it is desired to remove the original and copy sheet forms, it is only necessary to grasp the upstanding member 156 above the table and shift it forward to bring about clasping of the ends of the manifold papers, as shown in Figure 8, and unclasping the writing table whereupon it is sprung open under the action of the spring means 56 and at the same time the manifold papers are drawn up over the table during the opening movement of the writing table, as shown in Figures 9 and 10.

When the writing table reaches the position shown in Figure 10, the clamping member retaining the ends of the original and copy papers which are to be removed is released, as shown in Figure 10. Thereafter, the operator swings outward the hinged member 80 swingably fastened at the upper end of the writing table to move it into the position shown in Figure 11, which movement severs the ends of the copy sheets 75 which are to be retained in the machine and which fall back into place as shown in Figure 11. The writing table is now ready to be returned to its normal writing position. This is effected by forcing the writing table to swing downward against the spring and return it to the position shown in Figure 7, whereupon the manifold paper sheets which extend outward over the forward end of the machine and operating member 156 are grasped and torn off along the edge of the member 91, as shown in Figures 5 and 12.

During the latching of the writing table into position for making another record, the clamping member or plate 120 which holds the copy sheet form 75 to be retained in the machine is shifted away from the file rack member 204 by engagement of the surfaces 190 and 192 whereupon the divider plate 83 on the member 80 is permitted to pin the newly made copy sheet form onto the file rack pins 77. After disengagement of the surfaces 190 and 192, the machine parts are returned to the position shown in Figure 7 and the register is ready to repeat another cycle of operation.

While the structure illustrated of my invention has been described and shown as applied to one form of register, it is to be understood that my invention is applicable to registers of widely different forms and to paper feeding means in other machines and mechanism similar to that shown and described.

It is further to be understood that the structure described in the foregoing and illustrated in the drawings is merely an example of my invention and I desire to comprehend within my invention such modifications as may be necessary to adapt it to such widely varying uses as come within the scope of the claims and the invention.

Having thus fully described my invention, what I claim as new and desire to secure by Letters Patent is:

1. In an autographic register, a casing, a table swingably mounted in said casing, means for holding paper webs in the form of continuous superimposed sheets fan-folded into a pack in said casing, said paper webs being arranged on said table by advancing the leading edge of said webs around the end of said table and across said table, means for swinging said table away from said casing, and releasable clamping means on said casing for holding the forward ends of said paper webs fixed during the movement of said table away from the casing to cause the paper webs to be drawn from said fan-folded pack over said table a predetermined accurate distance.

2. In an autographic register, a casing, a table pivotally mounted in said casing, a compartment in said casing for storing paper webs in position to be fed over said table, said table having a transverse opening adjacent the pivoted end through which said paper webs are adapted to be moved over said table, means actuated by the movement of said table about its pivot to bring about the holding of the ends of the paper webs extended over said table stationary whereby upon the swinging of said table about its pivot away from said casing, the said paper webs are moved to a new position relative to said table, and means for yieldably urging said table away from said casing.

3. In an autographic register, a casing, a table pivotally mounted at one end of said casing, a compartment in said casing for storing paper webs in a zigzag folded pack, means comprising paper web clamping members arranged adjacent the swingable end of said table, said clamping means comprising means for holding the outer ends of the paper webs forming the original and copy papers which are to be ejected from said register, additional clamping means for holding the ends of the record sheets which are to be stored in said casing, and means actuated by the movement of said writing table away from said casing to release the ends of said paper webs which are to be ejected from said register.

4. In an autographic register, a casing, a writing table pivotally mounted at one end of said casing, a compartment in said casing for storing paper webs in a zigzag folded pack, means comprising releasable paper web clamping members on said casing adjacent the forward swingable end of said table, said clamping means comprising means for securing the leading edge of the paper webs forming the original and copy papers which are to be ejected from said register, means for retaining the ends of the record sheets which are to be stored in said casing, means actuated by the movement of said writing table away from said casing to release the ends of said paper webs which are to be ejected from said register, and means actuated by the return of said table to said casing for bringing about storing said record sheets in said casing.

5. In an autographic register, a casing, a writing table pivotally mounted to said casing, means for supporting paper webs in said casing and feeding the same over said table, means on said table for dividing said paper webs into two different portions, one of said paper web portions being adapted to be ejected from said register and the other retained as a record copy sheet within said casing, and paper serving means associated with said writing table and movable relative thereto for bringing about the detachment of said record sheet paper from said continuous web upon the movement of said table about its pivot away from said casing and the actuation of said paper serving means.

6. In an autographic register, a casing, means comprising a compartment for storing a plurality of paper webs, a movable table arranged to support said paper webs for writing thereon, means for urging said table away from said casing, means for locking said table against said casing in position for writing upon the paper webs, means comprising a paper web clamping member which is adapted to be moved into clamping engagement with said paper webs and simultaneously unlock said table from said casing, and means actuated by the movement of said table away from the casing to bring about the release of said paper web clamping means.

7. In an autographic register, a casing, means for storing a pack of paper webs in said casing, a movable table associated with said casing and adapted to support said paper webs for writing thereon, means associated with said writing table comprising carbon sheets which are arranged to be interleaved between said paper webs while supported on said table, means associated with said table for dividing the paper webs into the web forms which are to be ejected from the register and record copy sheets, and means for pinning the record copy sheets onto a storage rack disposed in said casing, said record copy paper storing being effected by the return of said table to said casing.

8. In a register, the combination of a casing for retaining manifold paper webs, a writing table pivotally supported to said casing over which said manifold paper webs are moved, means on said casing arranged adjacent said table for holding the ends of the manifold paper webs placed over said writing table, and means for urging said table to swing away from said casing to bring about movement of the paper webs over said table.

9. In a register, the combination of a casing in which manifold paper web forms are adapted to be positioned, writing table means movable relative to said casing on which said manifold paper web forms are arranged to be supported for writing upon, record sheet holding means associated with said casing, means independently operable to hold the outer ends of the manifold paper web forms in a fixed position during movement of said writing table away from said casing until it reaches its maximum movement with respect to said casing, and means operatively associated with said writing table for bringing about the detachment of said record sheet form from said manifold papers when said writing table is in its outermost position relative to said casing.

10. In an autographic register having a casing for storing a plurality of manifold paper webs arranged in the form of a pack, table means associated with said casing and movable relative thereto, said table being adapted to support said manifold paper webs fed from said pack thereover, latch means for locking said table against said casing in a writing position, and manual means operable to unlatch said writing table from said casing and permit it to be moved away from said casing, said manual means carrying a paper web clamping member which is adapted upon movement to unlatch said table to simultaneously contact and clamp the forward ends of said manifold paper webs adjacent said writing table during movement of said table away from said casing whereby said manifold paper webs are automatically drawn from said pack over said moving table.

11. In an autographic register having a casing for storing a plurality of manifold paper webs arranged in the form of a pack, table means associated with said casing and movable relative thereto, said table being adapted to support said manifold paper webs fed from said pack thereover, latch means for locking said table against said casing in a writing position, manual means operable to unlatch said writing table from said casing and permit it to be moved away from said casing, said manual means carrying a paper web clamping member which is adapted upon movement to unlatch said table to simultaneously contact and clamp the forward ends of said manifold paper webs adjacent said writing table during movement of said table away from said casing whereby said manifold paper webs are automatically drawn from said pack over said moving table, and means associated with said table for gripping the lowermost portion of said manifold paper webs and holding them in fixed position on said table when said table has been moved away from said casing substantially its maximum distance.

12. In a register having a casing comprising a compartment for storing manifold paper web forms, a writing table movably positioned on said casing over which said manifold paper web forms are adapted to be intermittently moved, means associated with said table for dividing the manifold paper web forms into webs which are to be ejected from said register and webs which are to be retained as record sheets in said casing, and means operatively associated with said casing for holding the outer ends of said manifold paper web forms fixed during a part of the movement of said writing table away from said casing.

13. In a register having a casing comprising a compartment for storing manifold paper web forms, a writing table movably positioned on said casing over which said manifold paper web forms are adapted to be intermittently moved, means associated with said table for dividing the manifold paper web forms into webs which are to be ejected from said register and webs which are to be retained as record sheets in said casing, means operatively associated with said writing table for holding the outer ends of said manifold paper web forms fixed during a part of the movement of said writing table away from said casing, and means actuated by the return of said writing table to said casing for fastening said record sheet forms onto a record sheet retaining means arranged in said casing.

14. In a register including means for retaining manifold paper webs having spaced forms thereon, the combination of a movable writing table associated therewith on which the manifold paper web forms are adapted to be supported, means for holding the outer ends of said manifold paper web forms adjacent the forward end of said table stationary during the movement of said table a predetermined distance whereby to advance the manifold paper webs over said table an accurate distance to position the next form thereon preparatory to making a record on said form, and means comprising tripping mechanism operatively associated with said writing table for automatically releasing said paper web holding means when said writing table reaches its outermost position relative to said holding means.

15. In a register of the class described, the combination of a writing table on which manifold paper web forms are adapted to be positioned with paper web retaining mechanism for holding the outer ends of said manifold paper web forms which have been advanced over said writing table, and means operatively associated with said paper web retaining means and operatively connected to said writing table whereupon movement of said writing table relative to said paper web holding means brings about the release of said paper web holding means after said writing table has been moved a predetermined distance from said paper holding means.

16. In a register of the class described, the combination of a base and a writing table movable relative to said base on which manifold paper web forms are adapted to be positioned for writing upon at spaced intervals, paper web retaining mechanism adjacent one end of said table for clamping the outer ends of said manifold paper web forms which have been advanced over said writing table to said base, means comprising a trip operated mechanism associated with said paper web retaining means and connected by a slidable link to said writing table whereupon movement of said writing table relative to said paper web holding means brings about the release of said paper web holding means after said writing table has been moved a predetermined distance from said paper clamping means, and means associated with said paper web holding means for fixedly mounting certain of said paper web forms in position to be retained in said register.

17. In a register of the class described including a casing for retaining manifold paper sheets, a writing table on which said manifold papers are adapted to be supported for writing upon, record sheet filing means operatively associated with said casing, reciprocable means associated with said casing for locking said record sheet on said record sheet filing means, and means pivotally mounted on said writing table for coacting with said locking means for moving the same out of locking engagement upon the return of said writing table to its normal position to effect the mounting of the next record sheet upon said record sheet filing means.

18. An improved method of feeding a plurality of superimposed manifold paper webs having spaced forms therealong intermittently over a support and into writing position in a register device comprising the steps of supporting a portion of said manifold webs on said support, fixedly holding the leading edges of said superimposed manifold paper webs to one part of said device and shifting said support to a new position relative to said first mentioned portion of manifold paper webs, retaining said superimposed webs on said support while the support is held at its new position, and returning said support to its normal writing position.

19. A method of feeding and expelling manifold paper web in an autographic register machine comprising the steps of positioning said web on a writing table or support, clamping the forward end of said web and retaining it in a fixed position relative to said table when said writing table has been moved to a new position, fixedly holding said web onto said support, releasing the end of said web, and returning the writing support to its normal location.

20. In a method of feeding, detaching and expelling manifold paper web forms in a register device for recording transactions, the steps of placing a plurality of superimposed paper webs having spaced forms thereon with weakened or perforated sections therebetween on a writing support, writing on said form, fixedly clamping the forward ends of said webs adjacent said writing support, moving said support relative to said clamped web portion to bring about the movement of manifold webs over said support, aligning and clamping said manifold webs onto said support so as to present a new writing form, detaching a record copy sheet from said manifold web forms, and returning said writing support to its normal position preparatory to making further recordings on said manifold paper forms.

21. In a method of recording transactions on manifold paper web forms, the steps of aligning and positioning superimposed paper web forms on a writing support, moving the paper web forms over said writing support, fixedly retaining the outer ends of said superimposed webs, moving said writing table relative to said webs to bring about drawing of additional paper web forms over said support in a new writing position, and longitudinally aligning said paper web forms.

22. In an autographic register of the character described, a writing table which is movable relative to the base of said register, said writing table comprising a hinged manifold paper web divider means, said divider means including a fixed blade for effecting the detachment of the record manifold paper sheet from the continuous web by manipulation of said hinged divider.

23. In an autographic register, a hinged writing table which is movable relative to the base of said register, the combination with said writing table of a movable member including manifold paper web divider plate means, and means for detaching a part of said manifold paper from said continuous web at a perforated or weakened tear-off section, said detachment being effected by manipulation of said divider plate means relative to said table.

24. In an autographic register, a writing table, said table being movable relative to the base of said register, said writing table movement being arranged to effect the feeding of manifold paper sheets in the form of a web over said table and in position to be written upon, and means carried by said table and movable relative thereto for effecting the detachment of at least a portion of said manifold paper web to form record sheet means.

25. In an autographic register, a writing table which is movable relative to the base of said register and including means for guiding manifold paper webs thereover in position to be written upon, and the combination of means actuated by the movement of said table away from the base of said register for clamping said manifold paper webs firmly to said table.

26. In an autographic register, a writing table which is movable relative to the base of said register and including means for guiding manifold paper webs thereover in position to be written upon, the combination of means actuated by the movement of said table away from the base of said register for clamping said manifold paper webs firmly to said table, said means comprising a bell crank lever actuated by a movable link attached to said table, and latch means associated with said base for holding the writing table in engagement with said base while writing upon said manifold paper web arranged on said table.

CLAYTON E. WYRICK.